United States Patent
Ishikawa

(10) Patent No.: US 12,374,363 B2
(45) Date of Patent: Jul. 29, 2025

(54) MAGNETIC TAPE DEVICE AND METHOD OF OPERATING MAGNETIC TAPE DEVICE

(71) Applicant: FUJIFILM Corporation, Tokyo (JP)

(72) Inventor: Ren Ishikawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 220 days.

(21) Appl. No.: 18/156,056

(22) Filed: Jan. 18, 2023

(65) Prior Publication Data

US 2023/0154493 A1      May 18, 2023

Related U.S. Application Data

(63) Continuation of application No. PCT/JP2021/015582, filed on Apr. 15, 2021.

(30) Foreign Application Priority Data

Jul. 20, 2020     (JP) .................. 2020-123830

(51) Int. Cl.
    *G11B 15/29*     (2006.01)
    *G11B 5/53*      (2006.01)
    *G11B 15/18*     (2006.01)

(52) U.S. Cl.
    CPC .............. *G11B 15/29* (2013.01); *G11B 5/532* (2013.01); *G11B 15/1883* (2013.01)

(58) Field of Classification Search
    CPC ..... G11B 15/26; G11B 15/60; G11B 15/1883; G11B 5/532; G11B 5/0086; G11B 5/584; G11B 5/735; G11B 21/10
    See application file for complete search history.

(56) References Cited

U.S. PATENT DOCUMENTS

| 6,754,033 B1 | 6/2004 | Argumedo et al. |
| 7,609,475 B2 | 10/2009 | Biskeborn et al. |
| 2008/0259490 A1 | 10/2008 | Fujita et al. |
| 2021/0249044 A1 | 8/2021 | Nakashio et al. |

(Continued)

FOREIGN PATENT DOCUMENTS

| JP | 6/282909 A | 10/1994 |
| JP | H06282909 | * 10/1994 |
| JP | 11-242814 A | 9/1999 |

(Continued)

OTHER PUBLICATIONS

International Search Report dated Jul. 20, 2021 issued by the International Searching Authority in Application No. PCT/JP2021/015582.

(Continued)

*Primary Examiner* — Yassin Alata
(74) *Attorney, Agent, or Firm* — Sughrue Mion, PLLC

(57) ABSTRACT

Provided is a magnetic tape device including: a magnetic head having a magnetic element that acts in proximity to a magnetic layer formed on a front surface of a magnetic tape; and a support member which is disposed at a position facing the magnetic head and against which a back surface of the magnetic tape provided on a side opposite to the front surface is pressed, in which the support member has a groove formed along a running direction of the magnetic tape only in a region corresponding to a non-acting region except for a region of the magnetic layer on which the magnetic element acts.

13 Claims, 17 Drawing Sheets

(56) References Cited

U.S. PATENT DOCUMENTS

2022/0284923 A1\* 9/2022 Yamaga ............... G11B 5/7356

FOREIGN PATENT DOCUMENTS

| | | | |
|---|---|---|---|
| JP | H11242814 | \* | 9/1999 |
| JP | 2006-244639 A | | 9/2006 |
| JP | 2006244639 | \* | 9/2006 |
| JP | 2007-287237 A | | 11/2007 |
| JP | 2009-015965 A | | 1/2009 |
| JP | 2009015965 | \* | 1/2009 |
| JP | 2010-272207 A | | 12/2010 |
| JP | 6635225 B1 | | 1/2020 |
| JP | 2020-077453 A | | 5/2020 |
| JP | 2020077453 | \* | 5/2020 |

OTHER PUBLICATIONS

Written Opinion dated Jul. 20, 2021 issued by the International Searching Authority in Application No. PCT/JP2021/015582.
International Preliminary Report on Patentability dated Jan. 24, 2023 with a Translation of the Written Opinion of the International Searching Authority in Application No. PCT/JP2021/015582.
Notification of Reasons for Refusal dated Feb. 7, 2023 from the Japanese Patent Office in application No. 2020-123830.

\* cited by examiner

MAGNETIC TAPE DEVICE AND METHOD OF OPERATING MAGNETIC TAPE DEVICE

CROSS-REFERENCE TO RELATED APPLICATIONS

This application is a continuation application of International Application No. PCT/JP2021/015582 filed on Apr. 15, 2021, the disclosure of which is incorporated herein by reference in its entirety. Further, this application claims priority from Japanese Patent Application No. 2020-123830 filed on Jul. 20, 2020, the disclosure of which is incorporated herein by reference in its entirety.

BACKGROUND

1. Technical Field

The technology of the present disclosure relates to a magnetic tape device and a method of operating a magnetic tape device.

2. Description of the Related Art

Various magnetic tape devices that cause a magnetic element of a magnetic head to act on a magnetic layer of a magnetic tape to record data on the magnetic layer and/or read data recorded on the magnetic layer have been proposed. As the magnetic tape device, there is a magnetic tape device equipped with a small magnetic head used for a hard disk drive, which records and/or reads data in a state in which a gap (called a spacing) of several nm to several tens of nm is provided between the magnetic layer and the magnetic element.

Meanwhile, there is known a problem of so-called entrained air in which air is entrained between the magnetic tape and a support member, such as a support roller, in a case where the magnetic tape is caused to run while being pressed against the support member. The entrained air causes a variation on the order of several hundred nm in a thickness direction of the running magnetic tape. For this reason, the variation in spacing due to the entrained air is fatal in a magnetic head that records and/or reads data with a spacing of several nm to several tens of nm between the above-described magnetic layer and the above-described magnetic element.

Conventionally, as a measure against entrained air, a method of forming grooves for removing air in the support member has been employed. The grooves are formed along a running direction of the magnetic tape. In particular, a roller in which grooves are formed is called a microgroove roller. For example, U.S. Pat. No. 7,609,475B discloses that grooves are formed uniformly or non-uniformly in a support roller disposed at a position facing the magnetic head.

SUMMARY

However, in a case where the support member in which the grooves are formed is used, there arises a new problem that the spacing may vary because of the magnetic tape entering the groove.

One embodiment according to the technology of the present disclosure provides a magnetic tape device and a method of operating a magnetic tape device capable of reducing a variation in spacing.

According to the present disclosure, there is provided a magnetic tape device comprising: a magnetic head having a magnetic element that acts in proximity to a magnetic layer formed on a front surface of a magnetic tape; and a support member which is disposed at a position facing the magnetic head and against which a back surface of the magnetic tape provided on a side opposite to the front surface is pressed, in which the support member has a groove formed along a running direction of the magnetic tape only in a region corresponding to a non-acting region except for a region of the magnetic layer on which the magnetic element acts.

It is preferable that a width of the magnetic head is smaller than a width of the magnetic tape.

It is preferable that the support member is a roller.

It is preferable that the groove has a V-shaped cross-section.

It is preferable that a plurality of sets of the magnetic heads and the support members are provided.

It is preferable that the magnetic head includes a feed head that operates in a case where the magnetic tape is fed out from a feed reel on which the magnetic tape is wound, and a rewind head that operates in a case where the magnetic tape is rewound on the feed reel, and the support member includes a feed support member disposed at a position facing the feed head, and a rewind support member disposed at a position facing the rewind head.

It is preferable that the magnetic layer has a first region and a second region that are divided with respect to a width direction of the magnetic tape, a magnetic element of the feed head acts on the first region, a magnetic element of the rewind head acts on the second region, the feed support member has the groove formed only in a region corresponding to the non-acting region except for the first region, and the rewind support member has the groove formed only in a region corresponding to the non-acting region except for the second region.

It is preferable that a plurality of data bands on which data is recorded are arranged in the magnetic layer along the width direction of the magnetic tape, the first region includes data bands of one half out of the plurality of data bands, and the second region includes data bands of the other half.

It is preferable that the first region includes data bands of one party of odd-numbered data bands or even-numbered data bands out of the plurality of data bands, and the second region includes data bands of the other party of the odd-numbered data bands or the even-numbered data bands.

It is preferable that a plurality of data bands on which data is recorded, and a plurality of servo bands on which a plurality of servo patterns used for servo control to move the magnetic head in a width direction of the magnetic tape are recorded are formed in the magnetic layer, and the data band and the servo band are alternately arranged along the width direction of the magnetic tape.

It is preferable that the magnetic head has, as the magnetic element, two servo pattern reading elements corresponding to two servo bands that sandwich one data band, and a data element provided between two servo pattern reading elements.

It is preferable that the data element includes a data recording element that records the data on the magnetic layer, and a data reading element that reads the data recorded on the magnetic layer.

According to the present disclosure, there is provided a method of operating a magnetic tape device, comprising: causing a magnetic tape to run while pressing a back surface of the magnetic tape provided on a side opposite to a front surface on which a magnetic layer is formed against a support member disposed at a position facing a magnetic head, the support member having a groove formed along a running direction of the magnetic tape only in a region corresponding to a non-acting region except for a region of the magnetic layer of the magnetic tape on which a magnetic element of the magnetic head acts; and causing the magnetic element to act in proximity to the magnetic layer of the magnetic tape in a state in which the back surface is pressed against the support member.

According to the technology of the present disclosure, it is possible to provide a magnetic tape device and a method of operating a magnetic tape device capable of reducing a variation in spacing.

BRIEF DESCRIPTION OF THE DRAWINGS

Exemplary embodiments according to the technique of the present disclosure will be described in detail based on the following figures, wherein.

DETAILED DESCRIPTION

Figure 1:
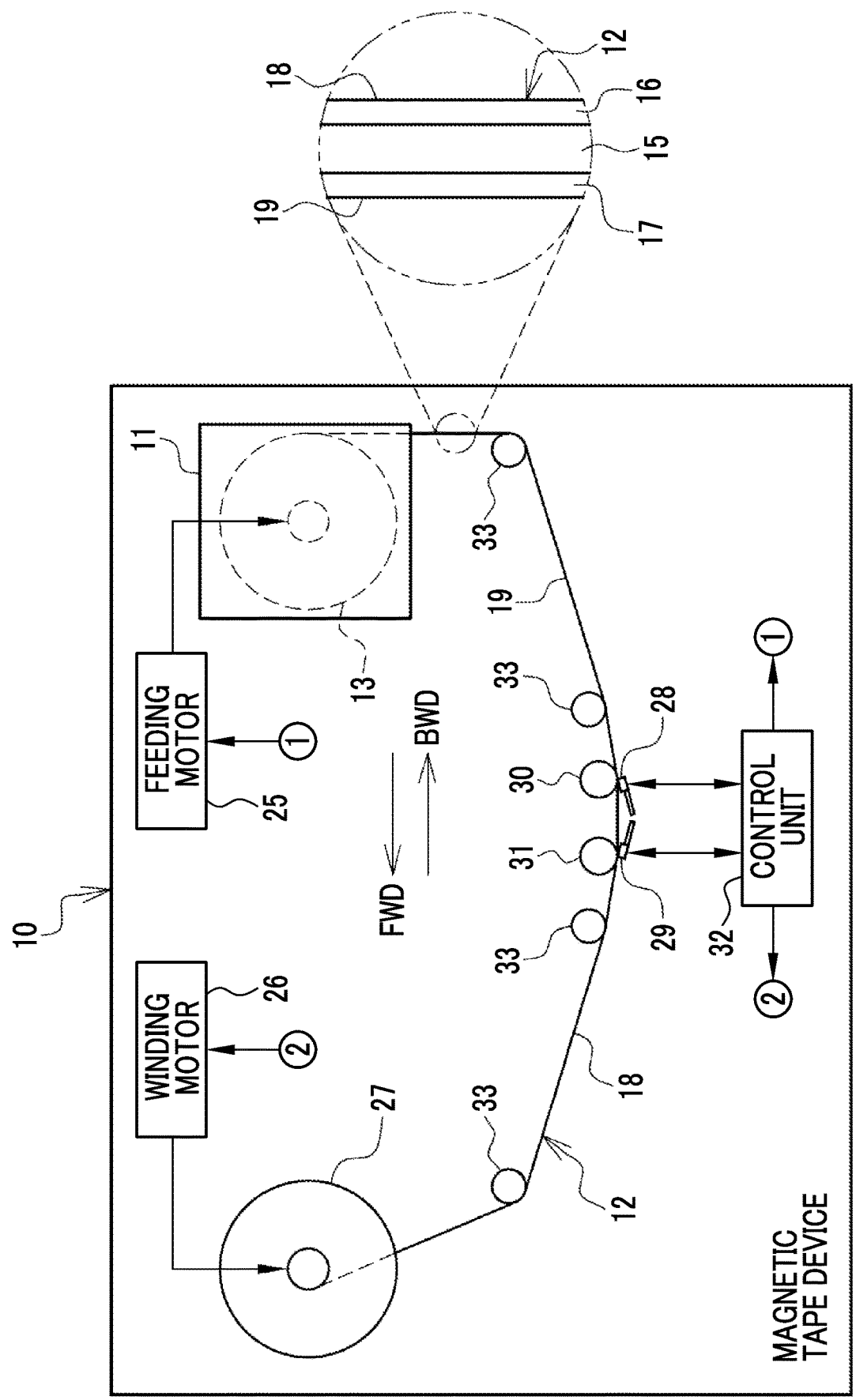
FIG. 1 is a diagram showing an example of a magnetic tape device.

In FIG. 1, a cartridge 11 is loaded into a magnetic tape device 10. A cartridge reel 13 on which a magnetic tape 12 is wound is accommodated in the cartridge 11. The magnetic tape device 10 records data on the magnetic tape 12 fed out from the cartridge reel 13. Further, the magnetic tape device 10 reads data recorded on the magnetic tape 12. The cartridge reel 13 is an example of the "feed reel" according to the technology of the present disclosure.

The magnetic tape 12 has, for example, a configuration in which a magnetic layer 16 and a back coating layer 17 are formed on a base film 15. In the magnetic tape 12, a surface on which the magnetic layer 16 is formed is a front surface 18 of the magnetic tape 12. On the other hand, a surface on which the back coating layer 17 is formed is a back surface 19 of the magnetic tape 12. Data is recorded on the magnetic layer 16. The magnetic layer 16 contains ferromagnetic powder. As the ferromagnetic powder, ferromagnetic powder generally used in the magnetic layer of various magnetic recording media can be used. Preferable specific examples of the ferromagnetic powder can include hexagonal ferrite powder. As the hexagonal ferrite powder, for example, hexagonal strontium ferrite powder or hexagonal barium ferrite powder can be used. The back coating layer 17 contains, for example, non-magnetic powder, such as carbon black. The base film 15 is also called a support and is formed of, for example, polyethylene terephthalate, polyethylene naphthalate, or polyamide. A non-magnetic layer may be formed between the base film 15 and the magnetic layer 16.

The magnetic tape device 10 comprises a feeding motor 25, a winding motor 26, a winding reel 27, a feed head 28, a rewind head 29, a feed support roller 30, a rewind support roller 31, a control unit 32, and the like. The feed head 28 and the rewind head 29 are an example of the "magnetic head" according to the technology of the present disclosure. The feed support roller 30 and the rewind support roller 31 are an example of the "support member" according to the technology of the present disclosure. Further, the feed support roller 30 is an example of the "feed support member" according to the technology of the present disclosure, and the rewind support roller 31 is an example of the "rewind support member" according to the technology of the present disclosure. Hereinafter, the feed head 28 and the rewind head 29 may be collectively denoted as a magnetic head. Similarly, the feed support roller 30 and the rewind support roller 31 may be collectively denoted as a support roller.

The feeding motor 25 rotates the cartridge reel 13 provided in the cartridge 11 under the control of the control unit 32. The magnetic tape 12 fed out from the cartridge reel 13 is wound on the winding reel 27. Further, the magnetic tape 12 wound up on the winding reel 27 is rewound on the cartridge reel 13. The winding motor 26 rotates the winding reel 27 under the control of the control unit 32.

The magnetic tape 12 runs in a feed direction FWD or a rewind direction BWD while being guided by the feed support roller 30, the rewind support roller 31, and a plurality of guide rollers 33 with the drive of the feeding motor 25 and the winding motor 26. The feed direction FWD is a direction from the cartridge reel 13 toward the winding reel 27. The rewind direction BWD is, on the contrary, a direction from the winding reel 27 toward the cartridge reel 13. The feed direction FWD and the rewind direction BWD are an example of the "running direction" according to the technology of the present disclosure. Further, in the magnetic tape 12, the rotational speed and the rotational torque of the feeding motor 25 and the winding motor 26 are adjusted so that the tension during running and the running speed are adjusted to appropriate values.

The feed head 28 and the rewind head 29 are disposed on the front surface 18 side of the magnetic tape 12 in order to access the magnetic layer 16. The feed head 28 and the rewind head 29 record data on the magnetic layer 16.

Further, the feed head 28 and the rewind head 29 read data recorded on the magnetic layer 16.

The feed head 28 operates in a case where the magnetic tape 12 is running in the feed direction FWD. In other words, the feed head 28 operates in a case where the magnetic tape 12 is fed out from the cartridge reel 13. On the other hand, the rewind head 29 operates in a case where the magnetic tape 12 is running in the rewind direction BWD. In other words, the rewind head 29 operates in a case where the magnetic tape 12 is rewound on the cartridge reel 13.

The feed head 28 and the rewind head 29 have the same structure except that operating timings are different from each other. The feed head 28 and the rewind head 29 are small magnetic heads, such as a magnetic head used for a hard disk drive. The feed head 28 and the rewind head 29 are provided at distal ends of suspensions 35 and 36 (see FIG. 2 and the like), respectively. Proximal ends of the suspensions 35 and 36 are movably attached to a frame of the magnetic tape device 10 via, for example, an arm. The feed head 28 and the rewind head 29 may be retracted to a standby position separated from the magnetic tape 12 during non-operation.

The feed support roller 30 and the rewind support roller 31 are disposed on the back surface 19 side of the magnetic tape 12 facing the feed head 28 and the rewind head 29. The feed support roller 30 and the rewind support roller 31 guide the magnetic tape 12 to the feed head 28 and the rewind head 29.

Figure 2:
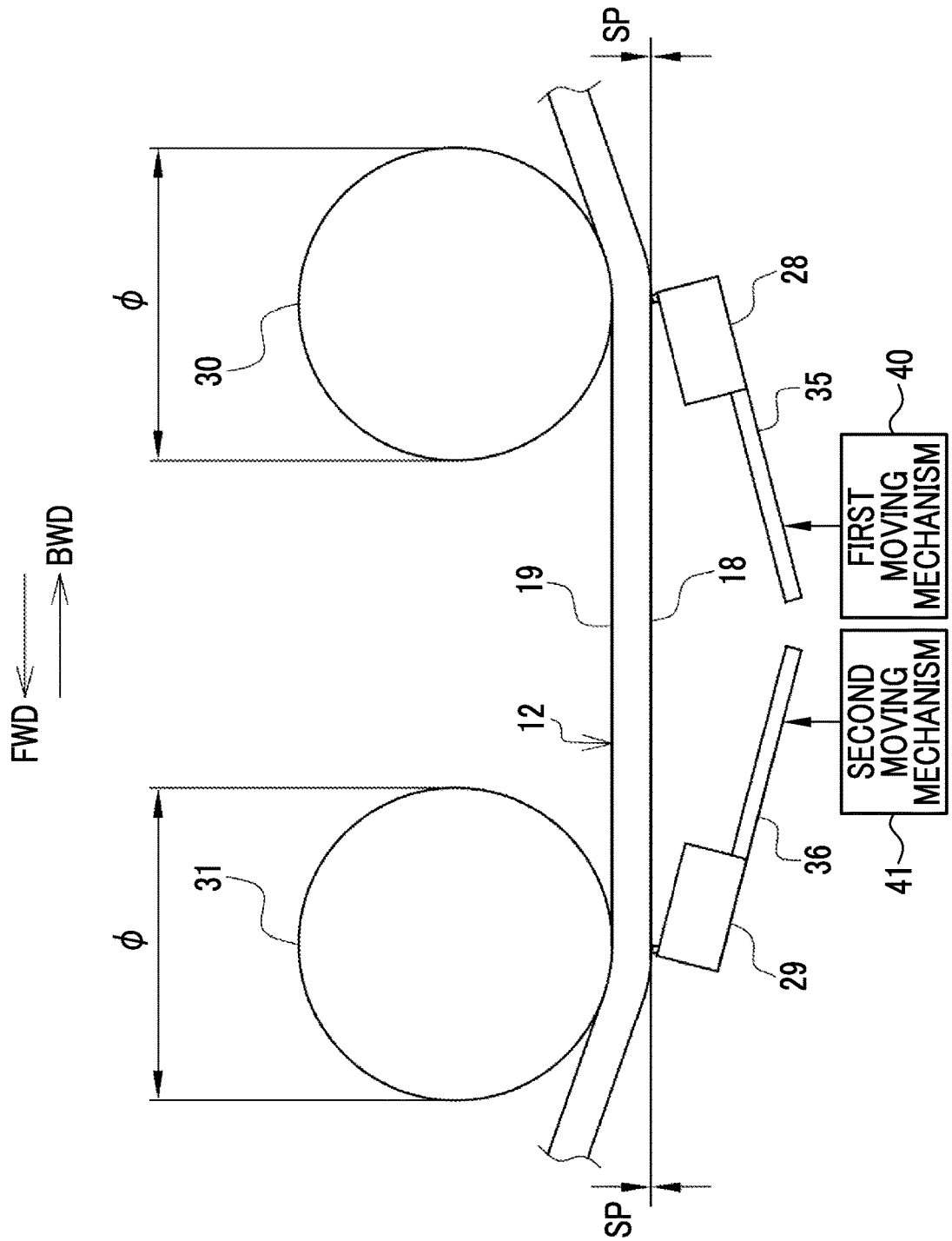
FIG. 2 is an enlarged view of vicinities of a feed head and of a rewind head.

As shown in the enlarged view of FIG. 2, the back surface 19 of the magnetic tape 12 is pressed against the feed support roller 30 and the rewind support roller 31. That is, the magnetic tape 12 runs while the back surface 19 is pressed against the feed support roller 30 and the rewind support roller 31. The feed support roller 30 and the rewind support roller 31 each have an outer diameter Φ of, for example, 10 mm. The magnetic tape 12 runs such that the center of a width direction WD (refer to FIG. 3 and the like, a direction perpendicular to a paper surface in FIG. 2) thereof coincides with the centers of the feed support roller 30 and of the rewind support roller 31. The feed head 28 and the rewind head 29 are disposed at positions facing portions where the back surface 19 of the magnetic tape 12 is pressed against the feed support roller 30 and the rewind support roller 31. The term "coincide" as used herein indicates a coincidence in a sense including an error generally allowed in the technical field to which the technology of the present disclosure belongs, in addition to the complete coincidence.

A first moving mechanism 40 is connected to the suspension 35, and a second moving mechanism 41 is connected to the suspension 36. The first moving mechanism 40 moves the suspension 35, that is, the feed head 28, in the width direction WD of the magnetic tape 12. Similarly, the second moving mechanism 41 also moves the suspension 36, that is, the rewind head 29, in the width direction WD of the magnetic tape 12. The first moving mechanism 40 and the second moving mechanism 41 each include, for example, an actuator, such as a voice coil motor or a piezoelectric element. A reference numeral SP indicates a spacing which is a gap between the magnetic layer 16 of the magnetic tape 12 and the magnetic elements of the feed head 28 and of the rewind head 29.

Figure 3:
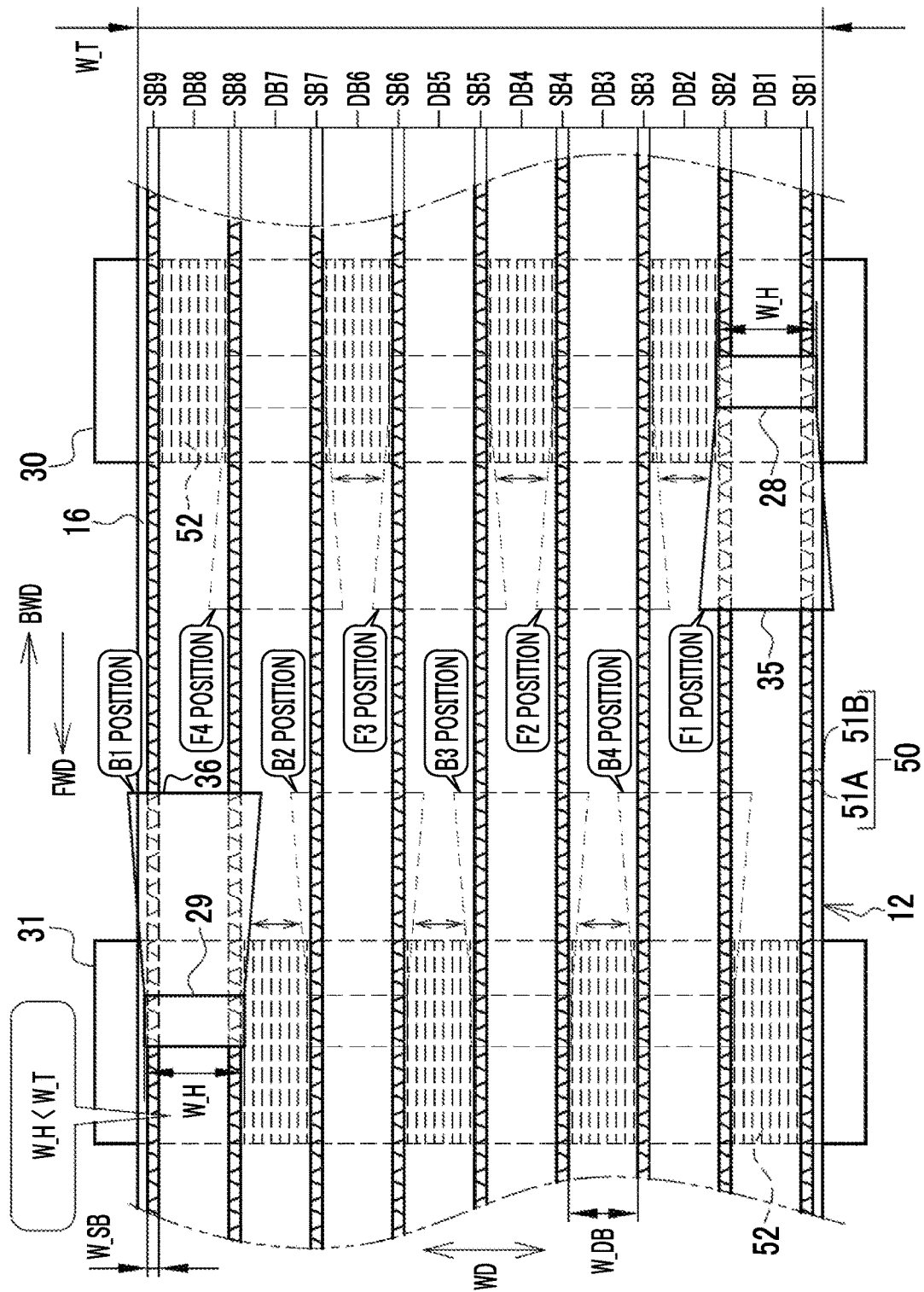
FIG. 3 is a plan view of a feed support roller and a rewind support roller as viewed from sides of the feed head and of the rewind head.

In FIG. 3 in which the feed support roller 30 and the rewind support roller 31 are viewed from the sides of the feed head 28 and of the rewind head 29, the feed head 28 and the rewind head 29 are disposed so as to be shifted from each other in the feed direction FWD and the rewind direction BWD (a length direction of the magnetic tape 12) such that the feed head 28 and the rewind head 29 do not interfere with each other. A width W_H of each of the feed head 28 and the rewind head 29 is smaller than a width W_T of the magnetic tape 12. Specifically, the width W_H of each of the feed head 28 and the rewind head 29 is about ⅛ of the width W_T of the magnetic tape 12. The width W_T of the magnetic tape 12 is, for example, 12.65 mm, and the width W_H of each of the feed head 28 and the rewind head 29 is, for example, 1.6 mm to 2.0 mm. Incidentally, other sizes such as the depth and the height of each of the feed head 28 and the rewind head 29 are also smaller than the width W_T of the magnetic tape 12 and are, for example, about several mm.

The magnetic layer 16 has eight data bands DB1, DB2, DB3, DB4, DB5, DB6, DB7, and DB8 on which data is recorded, and nine servo bands SB1, SB2, SB3, SB4, SB5, SB6, SB7, SB8, and SB9. These data bands DB1 to DB8 and these servo bands SB1 to SB9 are formed along the feed direction FWD and the rewind direction BWD. The data bands DB1 to DB8 are arranged at equal intervals along the width direction WD of the magnetic tape 12. The servo bands SB1 to SB9 are also arranged at equal intervals along the width direction WD of the magnetic tape 12. A width W_DB of each of the data bands DB1 to DB8 is, for example, 1.58 mm, and a width W_SB of each of the servo bands SB1 to SB9 is, for example, 100 μm.

The data band DB1 is disposed between the servo bands SB1 and SB2, and the data band DB2 is disposed between the servo bands SB2 and SB3. The data band DB3 is disposed between the servo bands SB3 and SB4, and the data band DB4 is disposed between the servo bands SB4 and SB5. The data band DB5 is disposed between the servo bands SB5 and SB6, and the data band DB6 is disposed between the servo bands SB6 and SB7. The data band DB7 is disposed between the servo bands SB7 and SB8, and the data band DB8 is disposed between the servo bands SB8 and SB9. That is, the data bands DB1 to DB8 and the servo bands SB1 to SB9 are alternately arranged along the width direction WD of the magnetic tape 12.

A servo pattern 50 is recorded on the servo bands SB1 to SB9. A plurality of the servo patterns 50 are provided at equal intervals along, for example, the feed direction FWD and the rewind direction BWD. The servo pattern 50 is composed of a pair of linearly symmetric magnetization regions 51A and 51B that are non-parallel to each other and that form a predetermined angle. The magnetization region 51A is tilted toward the rewind direction BWD side, and the magnetization region 51B is tilted toward the feed direction FWD side. The servo pattern 50 is used for the servo control to move the feed head 28 and the rewind head 29 in the width direction WD of the magnetic tape 12 through the first moving mechanism 40 and the second moving mechanism 41.

A plurality of grooves 52 are intermittently formed in the feed support roller 30 and the rewind support roller 31. The grooves 52 are formed along the feed direction FWD and the rewind direction BWD at preset pitches P (see FIG. 5) and sizes. The pitch P of the grooves 52 is, for example, 200 μm to 500 μm. A width W_G (see FIG. 5), which is the size of the groove 52, is, for example, 100 μm to 200 μm, and a depth D_G (see FIG. 5) is, for example, 10 μm to 100 μm.

Figure 4:
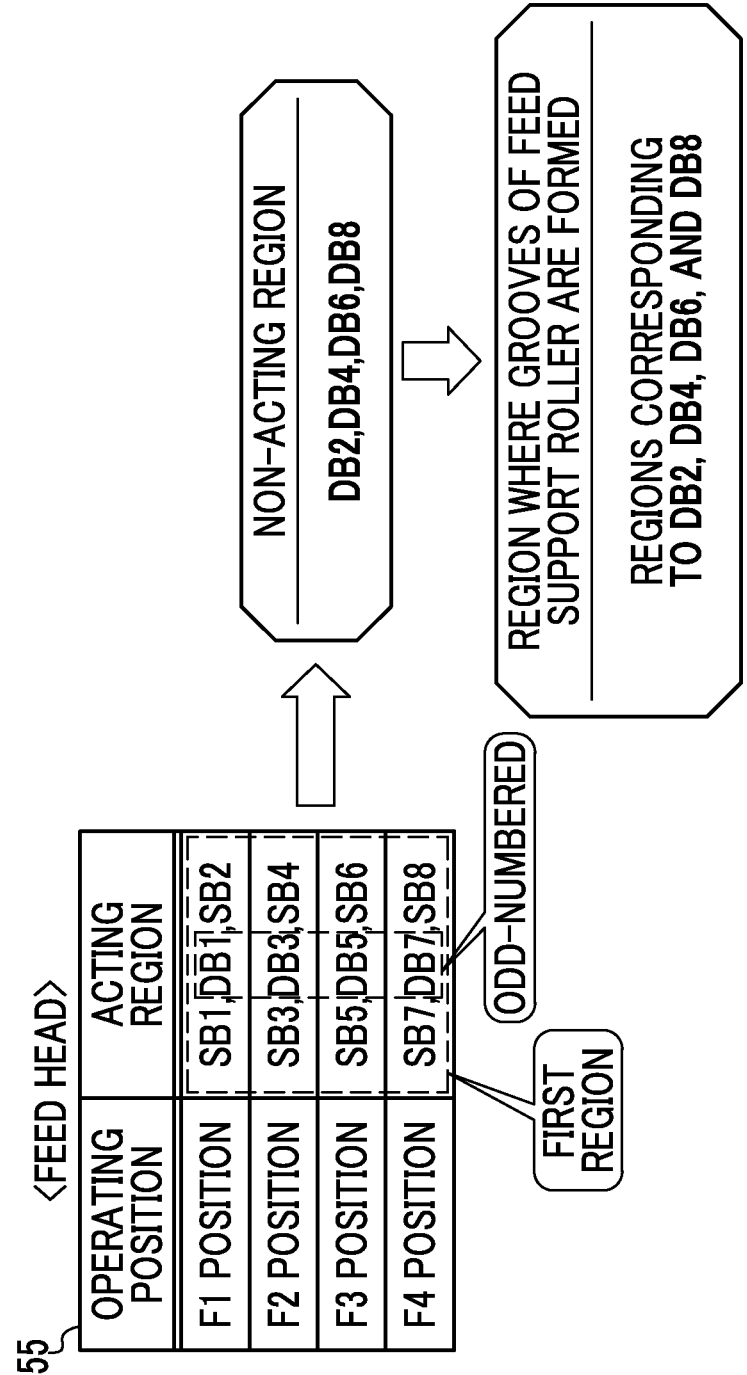
FIG. 4 is a diagram showing a table showing an operating position and an acting region of the feed head, a non-acting region of the feed head, and a region of the feed support roller where a groove is formed.

As shown in a table 55 of FIG. 4, the feed head 28 moves together with the suspension 35 to each operating position of an F1 position, an F2 position, an F3 position, and an F4 position. At each operating position, the feed head 28 records data on the data bands DB1, DB3, DB5, and DB7 and reads data recorded on the data bands DB1, DB3, DB5, and DB7. In addition, at each operating position, the feed head 28 reads the servo patterns 50 recorded on the servo bands SB1 and SB2 that sandwich the data band DB1, the servo bands SB3 and SB4 that sandwich the data band DB3, the servo bands SB5 and SB6 that sandwich the data band DB5, and the servo bands SB7 and SB8 that sandwich the data band DB7. In summary, regions (hereinafter, referred to as acting regions) of the magnetic layer 16 on which the magnetic element of the feed head 28 acts are the data bands DB1, DB3, DB5, and DB7 and the servo bands SB1 to SB8. These data bands DB1, DB3, DB5, and DB7 and these servo bands SB1 to SB8 are an example of the "first region" according to the technology of the present disclosure. Therefore, the first region includes the data bands DB1, DB3, DB5, and DB7 of one half out of eight data bands DB1 to DB8. Further, the first region includes the odd-numbered data bands DB1, DB3, DB5, and DB7 out of eight data bands DB1 to DB8.

Figure 5:
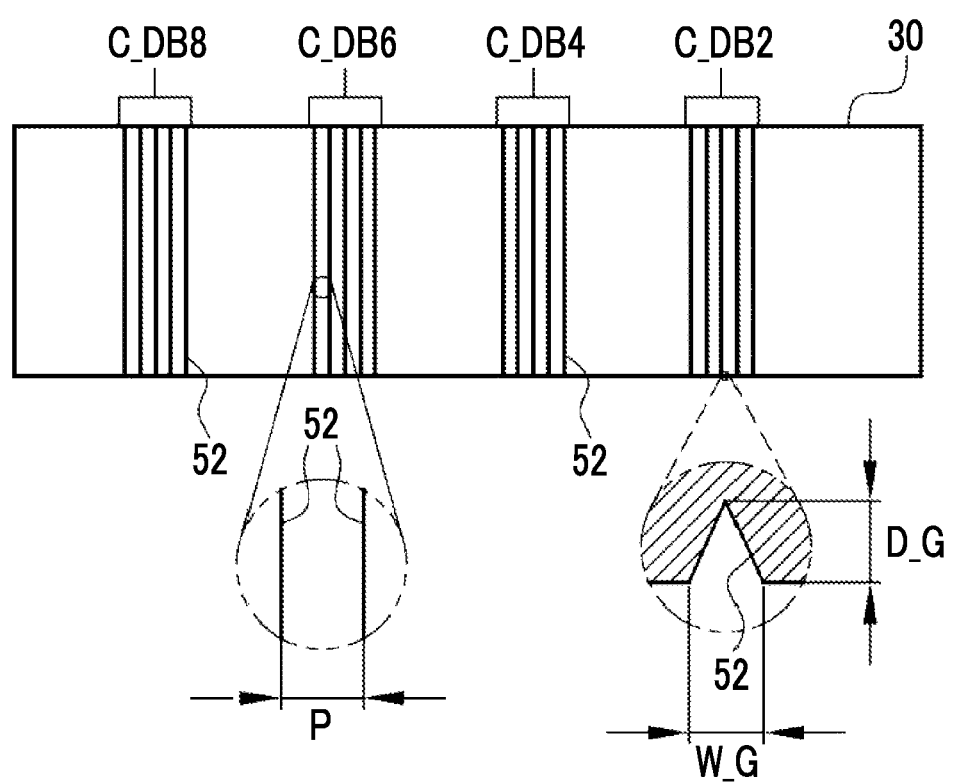
FIG. 5 is a plan view showing the feed support roller.

As shown in FIG. 4, non-acting regions except for the acting regions of the feed head 28 are the data bands DB2, DB4, DB6, and DB8. Therefore, in this example, as shown in FIG. 5, the grooves 52 are formed in the feed support roller 30 only in regions C_DB2, C_DB4, C_DB6, and C_DB8 corresponding to the data bands DB2, DB4, DB6, and DB8. The groove 52 has a V-shaped cross-section. Strictly speaking, the servo band SB9 is also included in the non-acting region of the feed head 28, but is excluded in this example. Of course, the servo band SB9 may be included in the non-acting region of the feed head 28.

Figure 6:
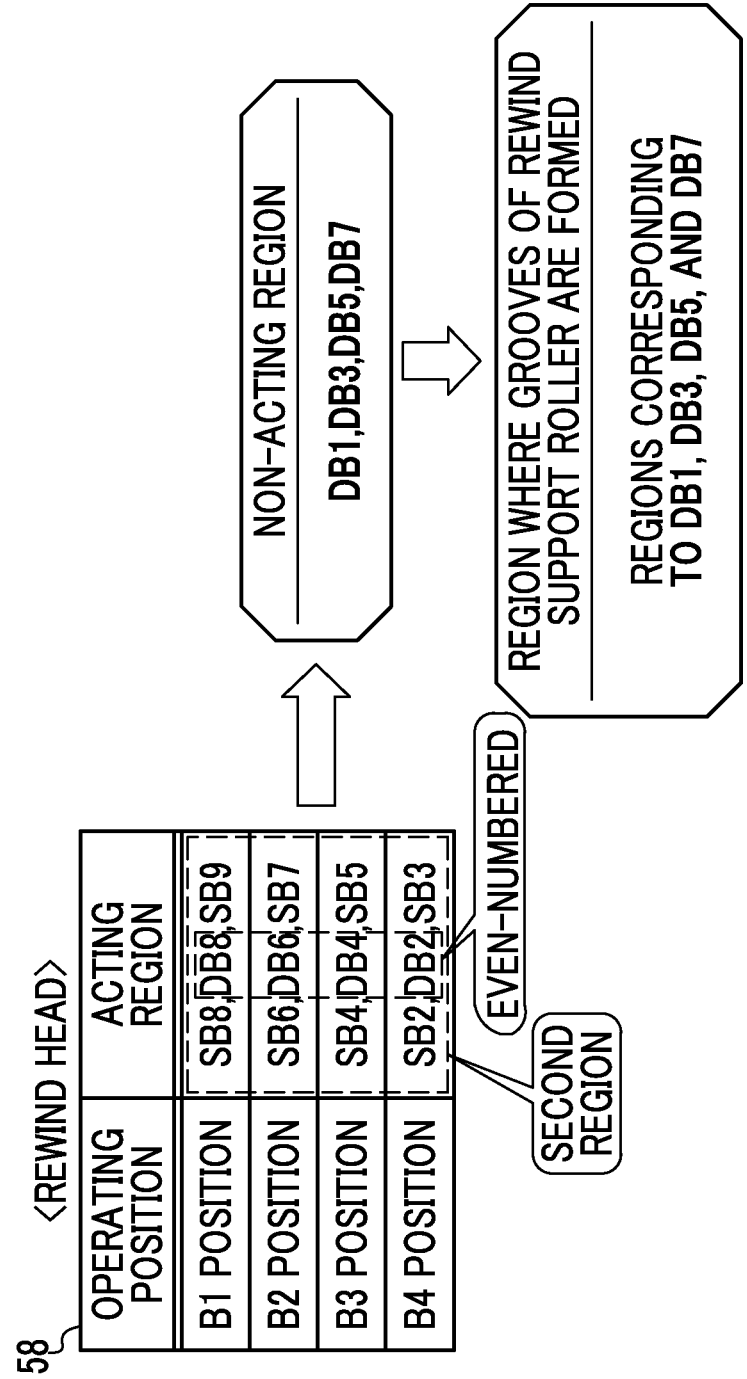
FIG. 6 is a diagram showing a table showing an operating position and an acting region of the rewind head, a non-acting region of the rewind head, and a region of the rewind support roller where a groove is formed.

On the other hand, as shown in a table 58 of FIG. 6, the rewind head 29 moves together with the suspension 36 to each operating position of a B1 position, a B2 position, a B3 position, and a B4 position. At each operating position, the rewind head 29 records data on the data bands DB8, DB6, DB4, and DB2 and reads data recorded on the data bands DB8, DB6, DB4, and DB2. In addition, at each operating position, the rewind head 29 reads the servo patterns 50 recorded on the servo bands SB8 and SB9 that sandwich the data band DB8, the servo bands SB6 and SB7 that sandwich the data band DB6, the servo bands SB4 and SB5 that sandwich the data band DB4, and the servo bands SB2 and SB3 that sandwich the data band DB2. In summary, the acting regions of the rewind head 29 are the data bands DB2, DB4, DB6, and DB8 and the servo bands SB2 to SB9. These data bands DB2, DB4, DB6, and DB8 and these servo bands SB2 to SB9 are an example of the "second region" according to the technology of the present disclosure. Therefore, the second region includes the data bands DB2, DB4, DB6, and DB8 of the other half out of eight data bands DB1 to DB8. Further, the second region includes the even-numbered data bands DB2, DB4, DB6, and DB8 out of eight data bands DB1 to DB8.

Figure 7:
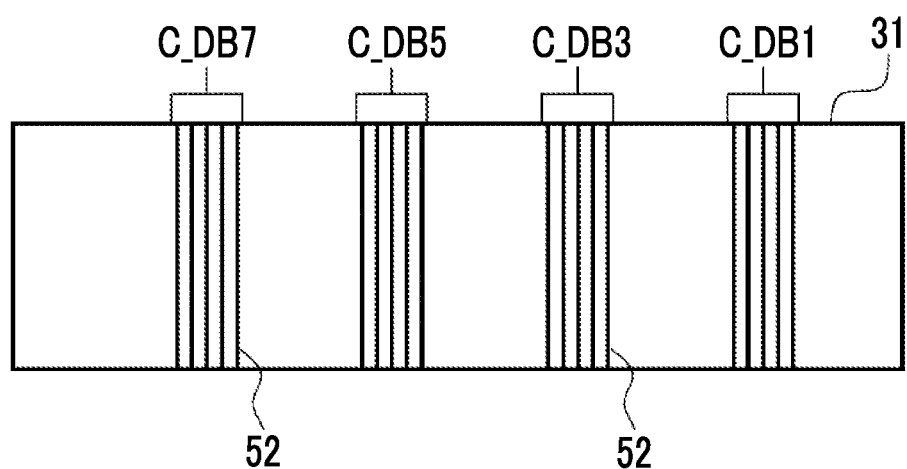
FIG. 7 is a plan view showing the rewind support roller.

As shown in FIG. 6, the non-acting regions except for the acting regions of the rewind head 29 are the data bands DB1, DB3, DB5, and DB7. Therefore, in this example, as shown in FIG. 7, the grooves 52 are formed in the rewind support roller 31 only in regions C_DB1, C_DB3, C_DB5, and C_DB7 corresponding to the data bands DB1, DB3, DB5, and DB7. Strictly speaking, the servo band SB1 is also included in the non-acting region of the rewind head 29, but is excluded in this example. Of course, the servo band SB1 may be included in the non-acting region of the rewind head 29.

Figure 8:
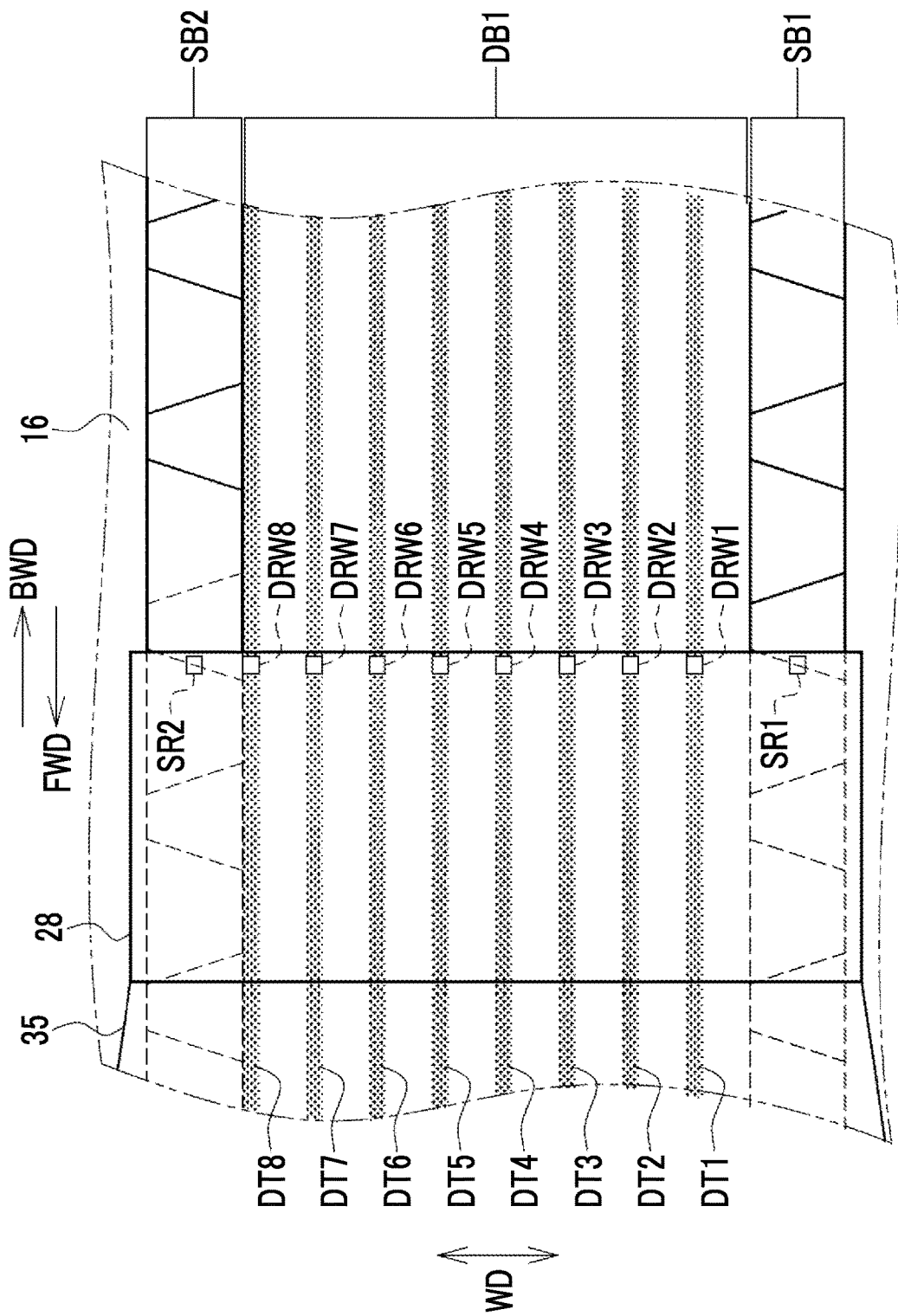
FIG. 8 is an enlarged view of a vicinity of the feed head at an F1 position.

In FIG. 8, which is an enlarged view of the vicinity of the feed head at the F1 position, the feed head 28 has a plurality of magnetic elements that are provided on a surface facing the magnetic layer 16 and that act on the magnetic layer 16. The feed head 28 causes the magnetic element to act on the magnetic layer 16 by bringing the magnetic element close to the magnetic layer 16 with the spacing SP on the order of several nm to several tens of nm therebetween. The magnetic element has two servo pattern reading elements SR1 and SR2, and eight data elements DRW1, DRW2, DRW3, DRW4, DRW5, DRW6, DRW7, and DRW8. Hereinafter, in a case where there is no need to make a particular distinction, the servo pattern reading elements SR1 and SR2 are collectively denoted as a servo pattern reading element SR, and the data elements DRW1 to DRW8 are collectively denoted as a data element DRW.

The servo pattern reading elements SR1 are provided at positions corresponding to the servo bands SB1, SB3, SB5, and SB7. Further, the servo pattern reading elements SR2 are provided at positions corresponding to the servo bands SB2, SB4, SB6, and SB8. The data elements DRW1 to DRW8 are provided between the servo pattern reading elements SR1 and SR2. The data elements DRW1 to DRW8 are arranged at equal intervals along the width direction WD of the magnetic tape 12. The data elements DRW1 to DRW8 simultaneously record data and/or read data with respect to eight data tracks DT1, DT2, DT3, DT4, DT5, DT6, DT7, and DT8.

Figure 9:
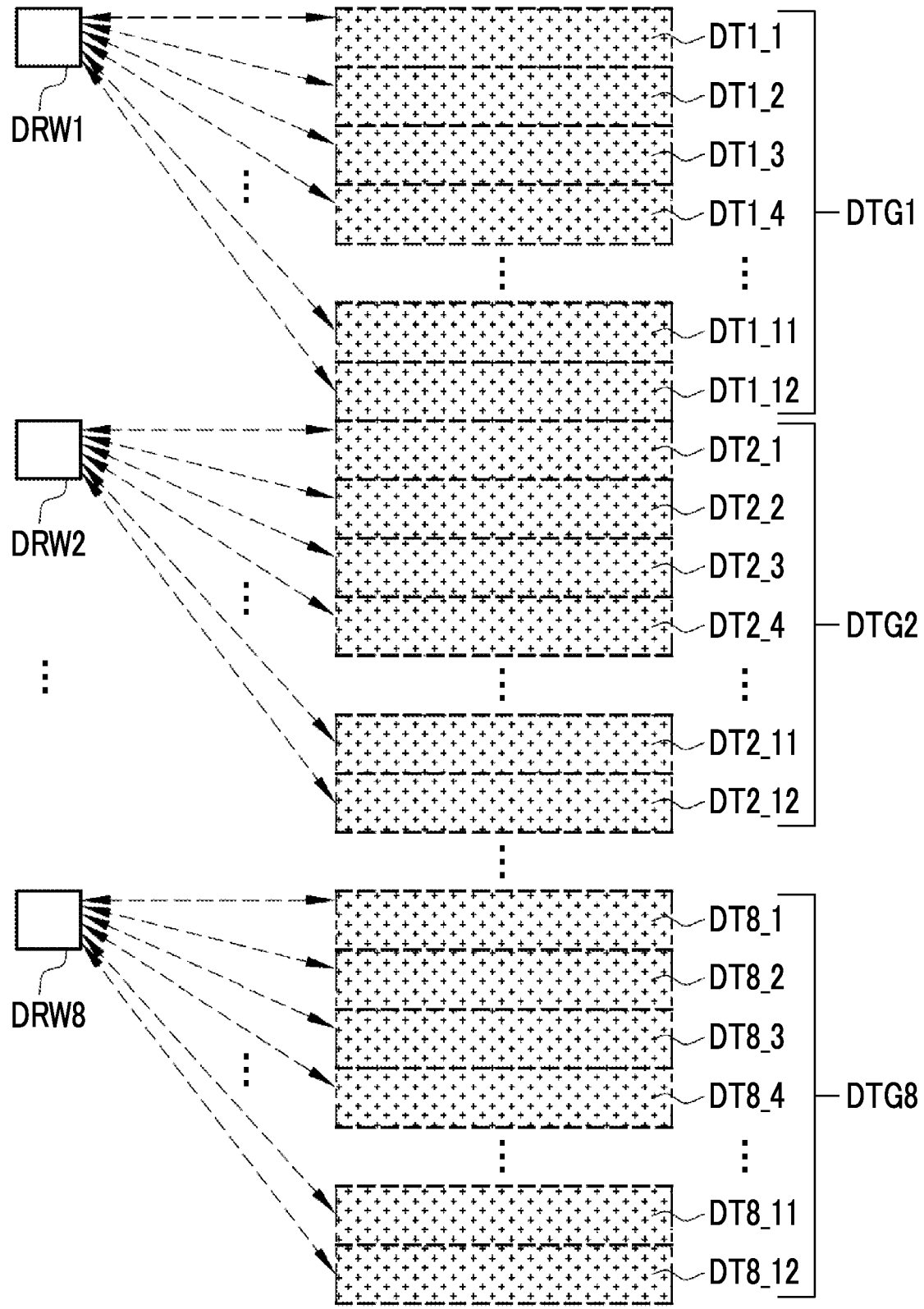
FIG. 9 is a diagram showing a correspondence relationship between a data element and a data track.

As shown in FIG. 9 as an example, the data element DRW1 is in charge of recording data on a data track group DTG1 composed of a total of 12 data tracks DT, that is, data tracks DT1_1, DT1_2, DT1_3, DT1_4, . . . , DT1_11, and DT1_12. In addition, the data element DRW1 is in charge of reading data recorded on the data track group DTG1. Similarly, the data element DRW2 is in charge of recording data on a data track group DTG2, which is composed of data tracks DT2_1 to DT2_12, and of reading data recorded on the data track group DTG2. Hereinafter, similarly, the data element DRW8 is in charge of recording data on a data track group DTG8, which is composed of data tracks DT8_1 to DT8_12, and of reading data recorded on the data track group DTG8. Twelve data tracks DT constituting each of the data track groups DTG1 to DTG8 are arranged at equal intervals along the width direction WD of the magnetic tape 12. The number of data tracks DT included in one data band DB is 8×12=96. In a case where there is no need to make a particular distinction, the data tracks DT1 to DT8 are collectively denoted as a data track DT.

The data element DRW is shifted to a position corresponding to one designated data track DT out of 12 data tracks with the movement of the feed head 28 in the width direction WD performed by the first moving mechanism 40. The data element DRW stays at a position corresponding to one designated data track DT through the servo control using the servo pattern 50.

Figure 10:
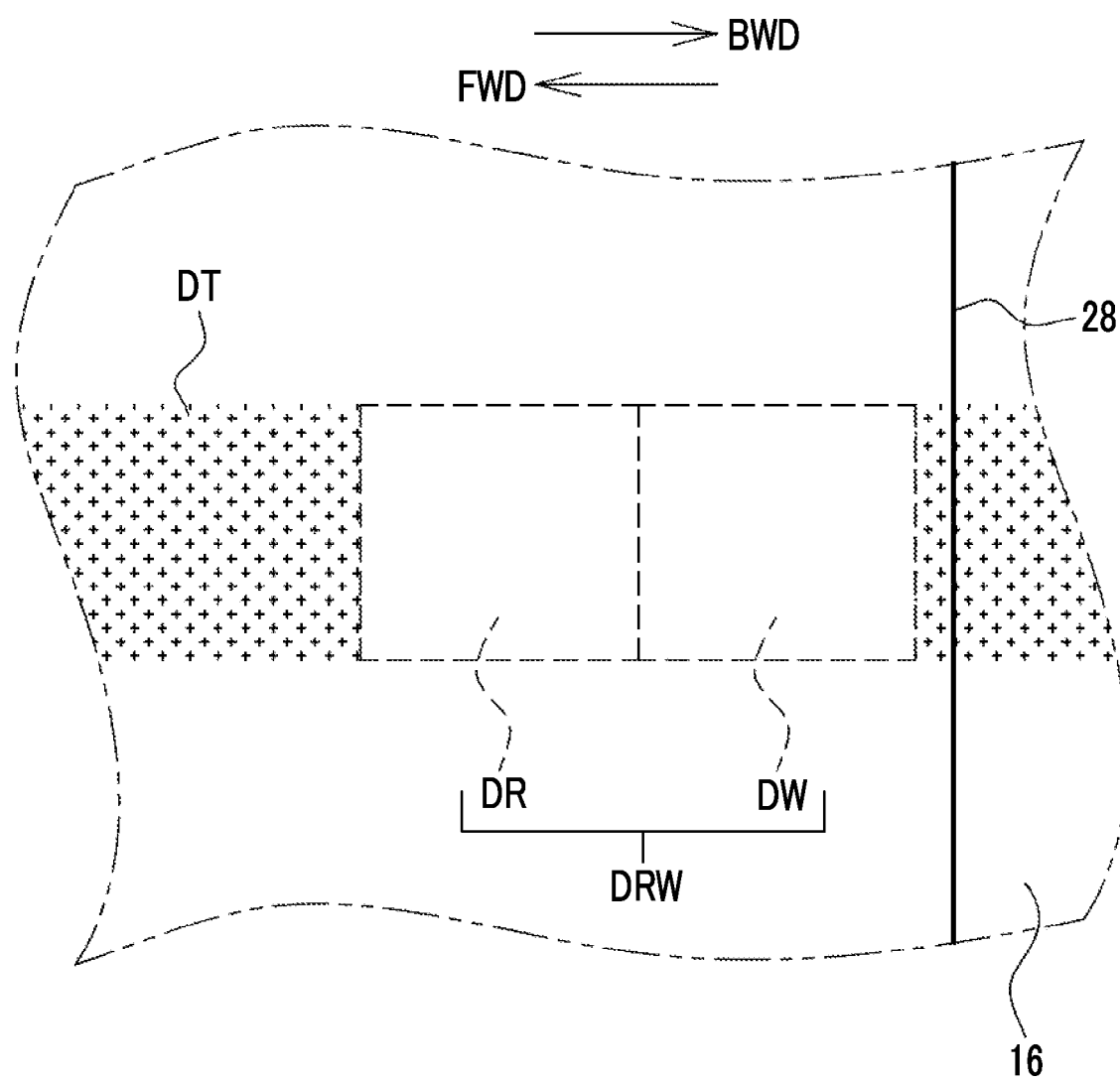
FIG. 10 is an enlarged view of the data element.

As shown in the enlarged view of FIG. 10, the data element DRW includes a data recording element DW and a data reading element DR. The data recording element DW records data on the data track DT. The data reading element DR reads the data recorded on the data track DT.

The data recording element DW is disposed on an upstream side of the feed direction FWD, and the data reading element DR is disposed on a downstream side of the feed direction FWD. The reason for such a disposition is that the data reading element DR immediately reads the data recorded by the data recording element DW to check errors.

Although neither shown nor described in detail, the rewind head 29 also has two servo pattern reading elements SR corresponding to the servo bands SB2 to SB9 and eight data elements DRW provided between two servo pattern reading elements SR. The data element DRW of the rewind head 29 records data and/or reads data with respect to 96 data tracks DT of each of the data bands DB2, DB4, DB6, and DB8. The data element DRW of the rewind head 29 includes a data recording element DW disposed on an upstream side of the rewind direction BWD and a data reading element DR disposed on a downstream side of the rewind direction BWD.

The control unit 32 is realized by, for example, a computer including a central processing unit (CPU), a memory, and a storage. The memory is, for example, a random access memory (RAM) or the like and temporarily stores various types of information. The storage, which is a non-transitory storage medium, is, for example, a hard disk drive or a solid state drive and stores various parameters and various programs. The CPU loads the program stored in the storage into the memory and executes processing in accordance with the program, thereby controlling the operation of each unit of the magnetic tape device 10 in an integrated manner.

Figure 11:
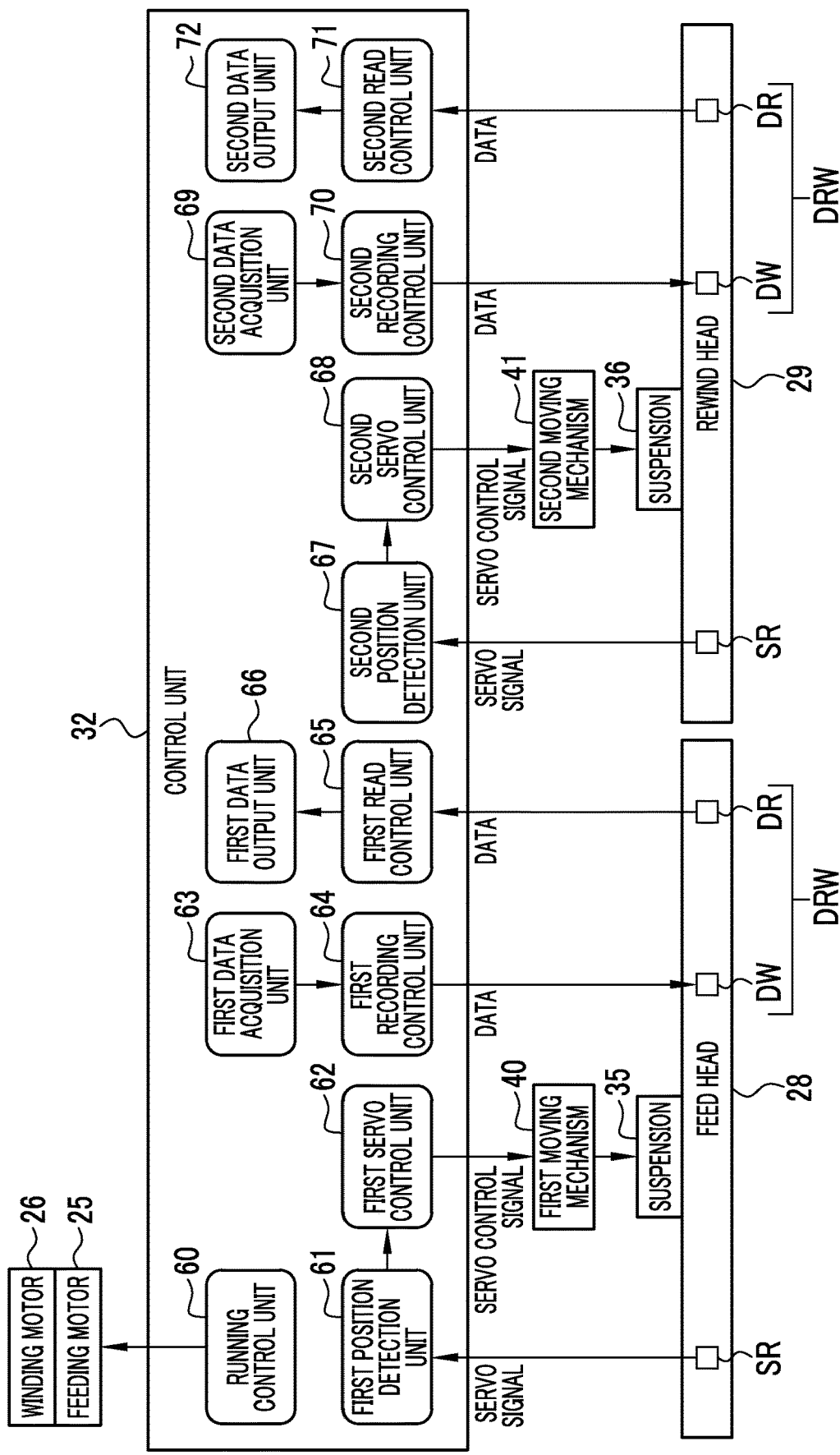
FIG. 11 is a block diagram of a control unit.

In FIG. 11, the control unit 32 functions as a running control unit 60, a first position detection unit 61, a first servo control unit 62, a first data acquisition unit 63, a first recording control unit 64, a first read control unit 65, a first data output unit 66, a second position detection unit 67, a second servo control unit 68, a second data acquisition unit 69, a second recording control unit 70, a second read control unit 71, and a second data output unit 72.

The running control unit 60 controls the drive of the feeding motor 25 and the winding motor 26 to cause the magnetic tape 12 to run in the feed direction FWD or the rewind direction BWD. Further, the running control unit 60 adjusts the rotational speed and the rotational torque of the feeding motor 25 and the winding motor 26 to adjust the tension during running and the running speed of the magnetic tape 12 to appropriate values.

A servo signal based on the servo pattern 50 read by the servo pattern reading element SR of the feed head 28 is input to the first position detection unit 61. The servo signal is intermittent pulses corresponding to the magnetization regions 51A and 51B. The first position detection unit 61 detects the position of the servo pattern reading element SR in the servo band SB in the width direction WD, that is, the position of the feed head 28 in the width direction WD with respect to the magnetic tape 12, on the basis of a pulse interval of the servo signal. The first position detection unit 61 outputs the detection result of the position of the feed head 28 in the width direction WD to the first servo control unit 62.

Two types of servo signals based on the servo patterns 50 read by two servo pattern reading elements SR are input to the first position detection unit 61. The first position detection unit 61 calculates the average value of the pulse intervals of two types of servo signals. Then, the first position detection unit 61 detects the position of the feed head 28 in the width direction WD, on the basis of the calculated average value.

The first servo control unit 62 compares the detection result of the position of the feed head 28 from the first position detection unit 61 with a target position of the feed head 28. In a case where the detection result is the same as the target position, the first servo control unit 62 does nothing. In a case where the detection result is displaced from the target position, the first servo control unit 62 outputs a servo control signal for making the position of the feed head 28 match the target position, to the first moving mechanism 40. The first moving mechanism 40 operates so as to make the position of the feed head 28 match the target position according to the servo control signal. The target position is stored in the storage, for example, in the form of a data table in which the values corresponding to the respective data tracks DT1 to DT8 are registered.

The first data acquisition unit 63 reads out and acquires the data to be recorded on any one of the data bands DB1, DB3, DB5, or DB7 by the feed head 28 from, for example, a host computer (not shown) connected to the magnetic tape device 10. The first data acquisition unit 63 outputs the data to the first recording control unit 64.

The first recording control unit 64 encodes the data output from the first data acquisition unit 63 into a digital signal for recording. Then, the first recording control unit 64 causes a pulse current corresponding to the digital signal to flow into the data recording element DW of the feed head 28 and causes the data recording element DW to record the data on the designated data track DT of any one of the data bands DB1, DB3, DB5, or DB7.

The first read control unit 65 controls the operation of the data reading element DR of the feed head 28 to cause the data reading element DR to read the data recorded on the designated data track DT of any one of the data bands DB1, DB3, DB5, or DB7. The data read by the data reading element DR is a pulse-shaped digital signal. The first read control unit 65 outputs this pulse-shaped digital signal to the first data output unit 66.

The first data output unit 66 decodes the pulse-shaped digital signal output from the first read control unit 65 to obtain data. The first data output unit 66 outputs the data to, for example, the host computer.

The second position detection unit 67, the second servo control unit 68, the second data acquisition unit 69, the second recording control unit 70, the second read control unit 71, and the second data output unit 72 have the same functions as the first position detection unit 61, the first servo control unit 62, the first data acquisition unit 63, the first recording control unit 64, the first read control unit 65, and the first data output unit 66, except that the above-described feed head 28 is replaced with the rewind head 29 and the data bands DB1, DB3, DB5, and DB7 are replaced with the data bands DB2, DB4, DB6, and DB8. Therefore, detailed description thereof will be omitted.

Figure 12:
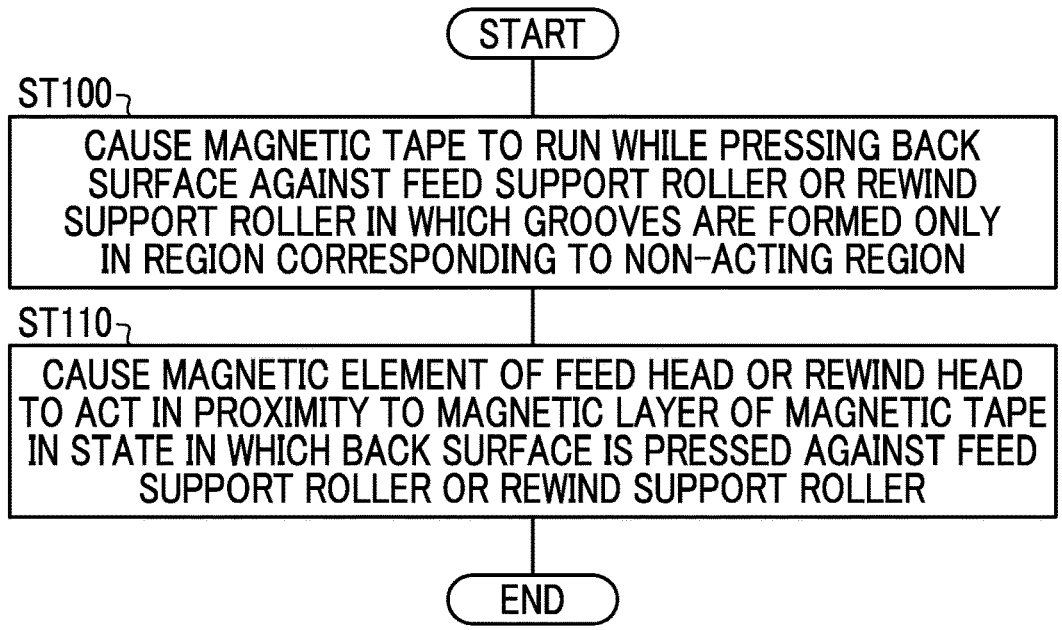
FIG. 12 is a flowchart showing an operation procedure of the magnetic tape device.

Hereinafter, the action of the above-described configuration will be described with reference to the flowchart of FIG. 12. First, under the control of the running control unit 60, the feeding motor 25 and the winding motor 26 are operated, and the magnetic tape 12 runs in the feed direction FWD or the rewind direction BWD. With this, as shown in FIG. 3 and the like, the magnetic tape 12 runs while the back surface 19 of the magnetic tape 12 is pressed against the feed support roller 30 in which the grooves 52 are formed only in the regions C_DB2, C_DB4, C_DB6, and C_DB8 corresponding to the data bands DB2, DB4, DB6, and DB8, which are the non-acting regions of the feed head 28, or against the rewind support roller 31 in which the grooves 52 are formed only in the regions C_DB1, C_DB3, C_DB5, and C_DB7 corresponding to the data bands DB1, DB3, DB5, and DB7, which are the non-acting regions of the rewind head 29 (step ST100).

Then, the magnetic element of the feed head 28 or the magnetic element of the rewind head 29 is caused to act in proximity to the magnetic layer 16 of the magnetic tape 12 in a state in which the back surface 19 is pressed against the feed support roller 30 or the rewind support roller 31 (Step ST110). Specifically, the servo pattern 50 is read by the servo pattern reading element SR. Further, the data is recorded on the data track DT by the data recording element DW under the control of the first recording control unit 64 or the second recording control unit 70. Furthermore, the data recorded on the data track DT is read by the data reading element DR under the control of the first read control unit 65 or the second read control unit 71.

The first position detection unit 61 or the second position detection unit 67 detects the position of the feed head 28 in the width direction WD or the position of the rewind head 29 in the width direction WD, from the interval of the servo signals based on the servo patterns 50. The first servo control unit 62 or the second servo control unit 68 compares the detection result of the position of the first position detection unit 61 or the second position detection unit 67 with the target position, and performs the servo control for making the position of the feed head 28 or the rewind head 29 match the target position.

As described above, the magnetic tape device 10 comprises the feed head 28 and the rewind head 29 as magnetic heads, and the feed support roller 30 and the rewind support roller 31 as support members. The feed head 28 and the rewind head 29 each have the magnetic element that acts in proximity to the magnetic layer 16 formed on the front surface 18 of the magnetic tape 12. The back surface 19 of the magnetic tape 12 provided on the side opposite to the front surface 18 is pressed against the feed support roller 30 and the rewind support roller 31. In the feed support roller 30 and the rewind support roller 31, the grooves 52 are formed along the running direction (the feed direction FWD and the rewind direction BWD) of the magnetic tape 12 only in the region corresponding to the non-acting region except for the region of the magnetic layer 16 on which the magnetic element acts.

Specifically, in the feed support roller 30, the grooves 52 are formed only in the regions C_DB2, C_DB4, C_DB6, and C_DB8 corresponding to the data bands DB2, DB4, DB6, and DB8, which are the non-acting regions of the feed head 28. Further, in the rewind support roller 31, the grooves 52 are formed only in the regions C_DB1, C_DB3, C_DB5, and C_DB7 corresponding to the data bands DB1, DB3, DB5, and DB7, which are the non-acting regions of the rewind head 29. Therefore, it is possible to reduce the variation in spacing SP due to the entrained air. Further, the spacing SP may vary because of the magnetic tape 12 entering the groove 52 in a case where the grooves 52 are formed in the region corresponding to the acting region. However, the grooves 52 are not formed in the region corresponding to the acting region, so that it is possible to reduce the variation in spacing SP due to the magnetic tape 12 entering the groove 52.

As shown in FIG. 3, the width W_H of each of the feed head 28 and the rewind head 29 is smaller than the width W_T of the magnetic tape 12. Since the weight is lighter than that of a magnetic head having a width W_H equal to or more than the width W_T, the response speed of the movement in the width direction WD in the servo control is high. Therefore, good followability can be obtained in the servo control.

As the support member, the feed support roller 30 and the rewind support roller 31 are used. Therefore, a contact area with the back surface 19 of the magnetic tape 12 can be reduced, and a probability that the magnetic tape 12 is displaced from a regular running position in the width direction WD because of vibration caused by friction can be reduced. In addition, an amount of foreign matter generated by being scraped off from the back surface 19 of the magnetic tape 12 because of friction can be reduced.

As shown in FIG. 5, the groove 52 has a V-shaped cross-section. Therefore, it is easier to process the groove 52 than a groove having a U-shaped cross-section. Further, since an angle of an upper opening edge of the groove 52 to the back surface 19 of the magnetic tape 12 is an obtuse angle, the back surface 19 of the magnetic tape 12 is less likely to be scratched as compared with the groove having a U-shaped cross-section in which the angle of the upper opening edge is 90°.

As shown in FIG. 1 and the like, a plurality of sets of the magnetic heads and the support rollers are provided. Specifically, the magnetic head is composed of the feed head 28 that operates in a case where the magnetic tape 12 is fed out from the cartridge reel 13 of the cartridge 11 in which the magnetic tape 12 is accommodated, and the rewind head 29 that operates in a case where the magnetic tape 12 is rewound on the cartridge reel 13. The support roller is composed of the feed support roller 30 disposed at a position facing the feed head 28 and the rewind support roller 31 disposed at a position facing the rewind head 29. Therefore, data can be recorded and/or read by using the magnetic head and the support roller that are suitable for each of the case where the magnetic tape 12 is fed out and the case where the magnetic tape 12 is rewound.

As shown in FIG. 3 and the like, the magnetic element of the feed head 28 acts on the first region of the magnetic tape 12, and the magnetic element of the rewind head 29 acts on the second region of the magnetic tape 12. The feed support roller 30 has the grooves 52 formed only in the region corresponding to the non-acting region except for the first region, and the rewind support roller 31 has the grooves formed only in the region corresponding to the non-acting region except for the second region. Therefore, it is possible to improve the efficiency of recording and/or reading data.

As shown in FIG. 3 and the like, in the magnetic layer 16, eight data bands DB1 to DB8 on which data is recorded are arranged along the width direction WD of the magnetic tape 12. The first region includes the data bands DB1, DB3, DB5, and DB7 of one half out of the eight data bands DB1 to DB8, and the second region includes the data bands DB2, DB4, DB6, and DB8 of the other half. Therefore, the feed head 28 and the rewind head 29 can have the same configuration, and various control methods, such as data recording control, need not be significantly changed. Further, the feed support roller 30 and the rewind support roller 31 may have substantially the same configuration.

As shown in FIGS. 4 and 6, the first region includes the odd-numbered data bands DB1, DB3, DB5, and DB7 out of the plurality of data bands DB1 to DB8, and the second region includes the even-numbered data bands DB2, DB4, DB6, and DB8. Therefore, the grooves 52 can be formed in the feed support roller 30 and the rewind support roller 31 without any bias in position. As a result, the discharge bias of the entrained air in the feed support roller 30 and the rewind support roller 31 is less likely to occur.

As shown in FIG. 3, the servo band SB on which the servo pattern 50 used for the servo control to move the feed head 28 or the rewind head 29 in the width direction WD is recorded is formed in the magnetic layer 16, in addition to the data band DB. The servo band SB and the data band DB are alternately arranged along the width direction WD of the magnetic tape 12. Therefore, the servo control to make the position of the feed head 28 or the rewind head 29 match the target position can be performed.

As shown in FIG. 8, the feed head 28 and the rewind head 29 each include two servo pattern reading elements SR corresponding to two servo bands SB that sandwich one data band DB and the data element DRW provided between two servo pattern reading elements SR, as the magnetic elements. Therefore, more accurate servo control based on the servo patterns 50 read by two servo pattern reading elements SR can be performed.

The data element DRW includes the data recording element DW that records data on the magnetic layer 16 and the data reading element DR that reads the data recorded on the magnetic layer 16. Therefore, data recording and data reading can be smoothly performed. The data element DRW may be any one of the data recording element DW or the data reading element DR.

Figure 13:
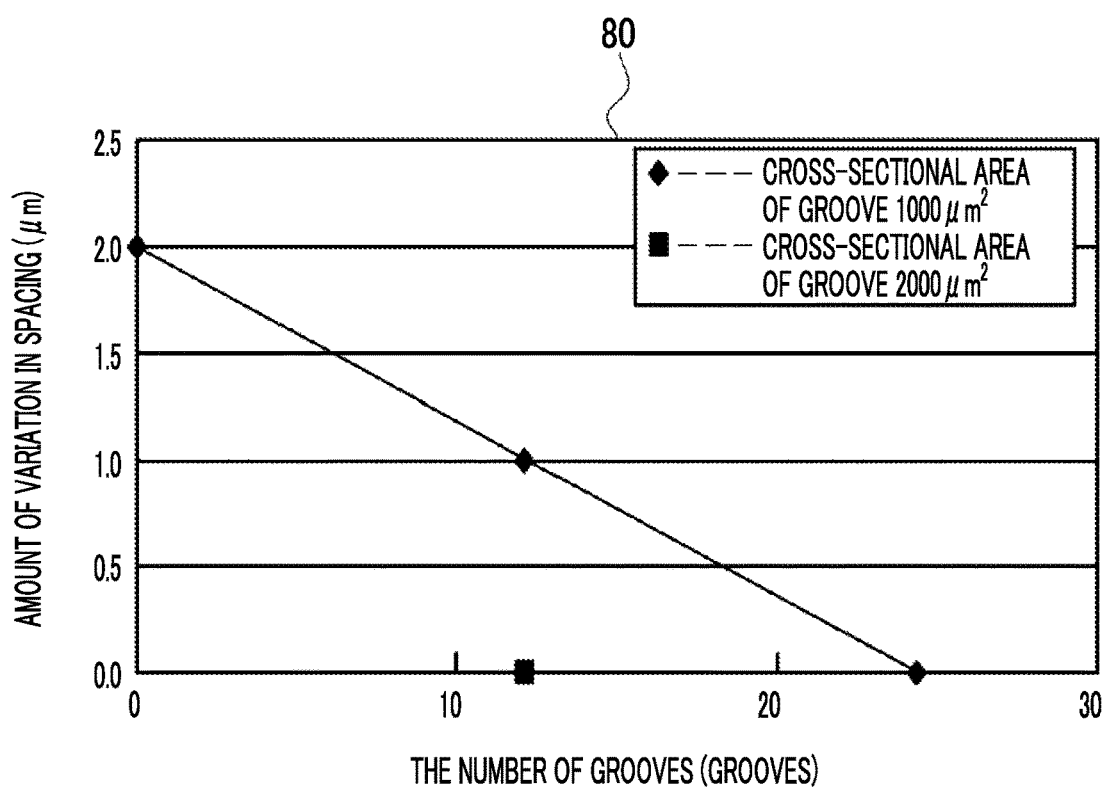
FIG. 13 is a graph showing a simulation result of an amount of variation in spacing due to entrained air with respect to the number of grooves.

A graph 80 shown in FIG. 13 as an example shows a simulation result of the amount of variation in spacing SP due to the entrained air with respect to the number of grooves 52. The conditions of simulation are such that the width W_T of the magnetic tape 12 is 12.65 mm, the outer diameter 1 of each of the feed support roller 30 and the rewind support roller 31 is 10 mm, the running speed of the magnetic tape 12 is 6 m/s, and the tension of the magnetic tape 12 during running is 0.55 N. Further, the grooves 52 have a pitch P=500 μm and a cross-sectional shape is V-shaped. A mark ◆ indicates a case where the cross-sectional area of the groove 52 is 1000 μm² (for example, the width W_G of the groove 52=100 μm and the depth D_G=10 μm), and a mark ■ indicates a case where the cross-sectional area of the groove 52 is 2000 μm² (for example, the width W_G of the groove 52=100 μm and the depth D_G=20 μm, or the width W_G of the groove 52=200 μm and the depth D_G=10 m).

In the case of the cross-sectional area of 1000 μm² marked with ◆, the amount of variation in spacing SP due to the entrained air is estimated to be 2 μm in a case where the number of grooves 52 is zero, that is, the grooves 52 are not formed. On the other hand, in a case where the number of grooves 52 is 24, that is, the grooves 52 are formed over the entire regions of the feed support roller 30 and of the rewind support roller 31 without the limitation to the region corresponding to the non-acting region, the amount of variation in spacing SP due to the entrained air can be made zero.

In this example, the grooves 52 are formed only in the region corresponding to the non-acting region. Therefore, the number of grooves 52 is halved to 12 from 24 in a case where the grooves 52 are formed over the entire region. In the case of the cross-sectional area of 1000 μm² marked with ◆, the amount of variation in spacing SP due to the entrained air is estimated to be 1 μm in a case where the number of grooves 52 is 12. However, in a case where the cross-sectional area is doubled to 2000 μm² by widening the width W_G and/or increasing the depth D_G of the groove 52, the amount of variation in spacing SP due to the entrained air can be made zero as in the case where the grooves 52 are formed over the entire region with a cross-section area of 1000 μm². As described above, it is confirmed that the technology of the present disclosure can reduce the variation in spacing SP due to the entrained air.

As a variation that is likely to affect the spacing SP other than the entrained air, there is a variation due to eccentricity of the feed support roller 30, the rewind support roller 31, and the like. However, such a variation due to eccentricity of the roller can be suppressed to a period of about 0.2 kHz. Further, in a small magnetic head such as a magnetic head used for the hard disk drive illustrated above, variations in a period of about 20 kHz can be followed without any particular control. Therefore, it may be considered that the variation due to the eccentricity of the roller does not affect the spacing SP.

The distribution of the data band DB and the servo band SB to the first region and the second region is not limited to the above-described example. For example, distribution may be performed as shown in FIGS. 14 to 17.

Figure 14:
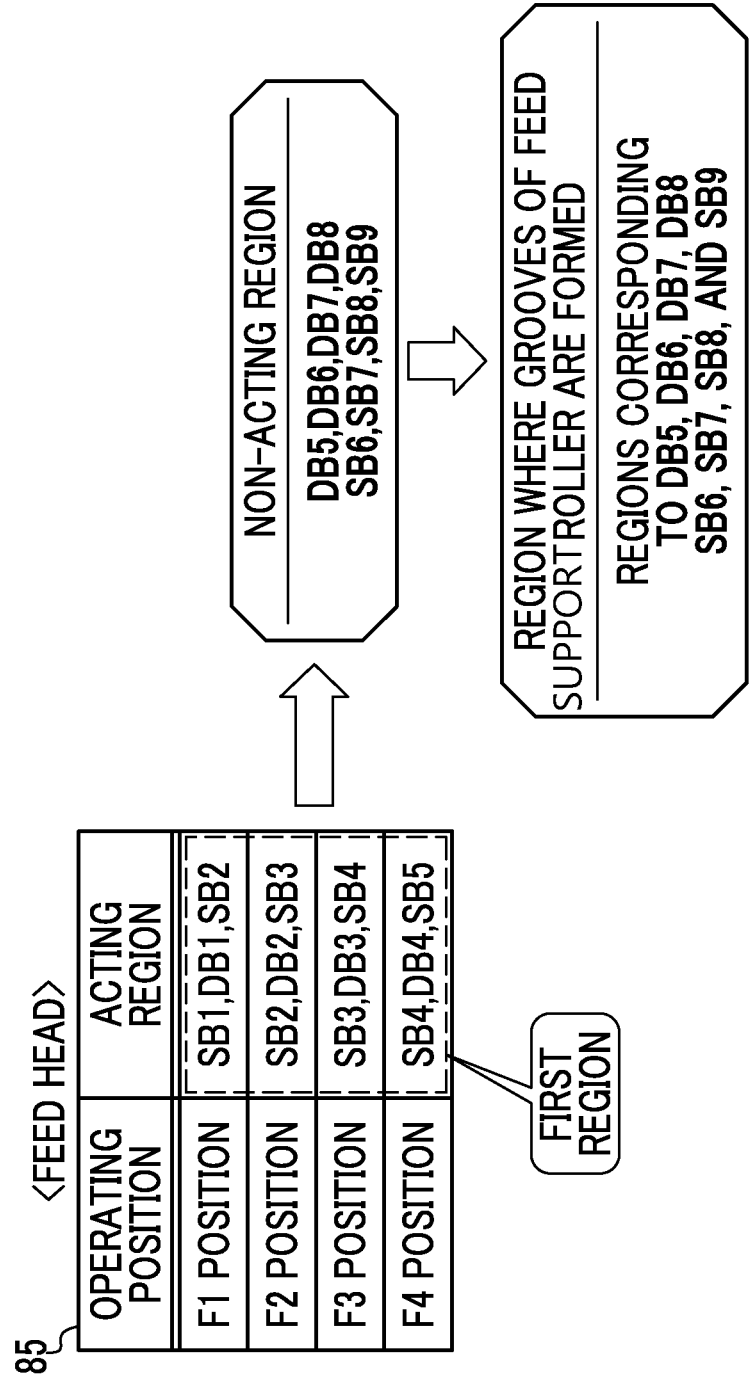
FIG. 14 is a diagram showing another example of the table showing the operating position and the acting region of the feed head, the non-acting region of the feed head, and the region of the feed support roller where the groove is formed.

As shown in a table 85 of FIG. 14, the feed head 28 records data on the data bands DB1, DB2, DB3, and DB4 and reads data recorded on the data bands DB1 to DB4, at each operating position of the F1 position, the F2 position, the F3 position, and the F4 position. In addition, the feed head 28 reads the servo patterns 50 recorded on the servo bands SB1 and SB2 that sandwich the data band DB1, the servo bands SB2 and SB3 that sandwich the data band DB2, the servo bands SB3 and SB4 that sandwich the data band DB3, and the servo bands SB4 and SB5 that sandwich the data band DB4, at each operating position. In summary, the acting regions of the feed head 28 in this case are the data bands DB1 to DB4 and the servo bands SB1 to SB5. These data bands DB1 to DB4 and these servo bands SB1 to SB5 are an example of the "first region" according to the technology of the present disclosure. Therefore, the first region includes the data bands DB1 to DB4 of one half out of eight data bands DB1 to DB8.

Figure 15:
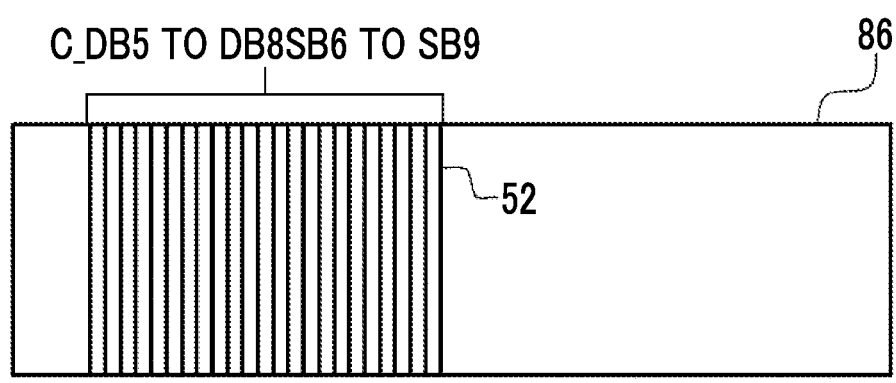
FIG. 15 is a plan view showing the feed support roller in the example of FIG. 14.

The non-acting regions except for the acting regions of the feed head 28 are the data bands DB5, DB6, DB7, and DB8 and the servo bands SB6, SB7, SB8, and SB9. Therefore, in this example, as shown in FIG. 15, the grooves 52 are formed in a feed support roller 86 only in regions C_DB5 to DB8SB6 to SB9 corresponding to the data bands DB5 to DB8 and the servo bands SB6 to SB9.

Figure 16:
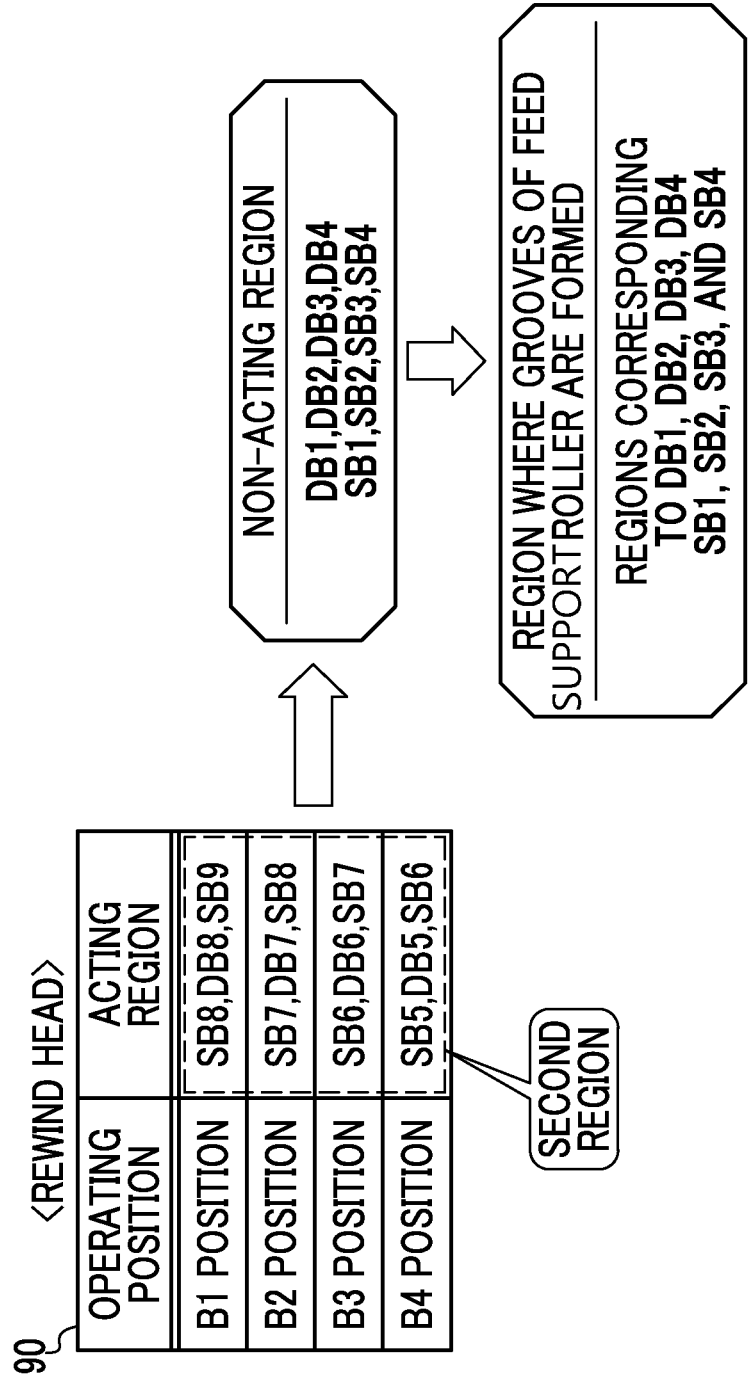
FIG. 16 is a diagram showing another example of the table showing the operating position and the acting region of the rewind head, the non-acting region of the rewind head, and the region of the rewind support roller where the groove is formed.

On the other hand, as shown in a table 90 of FIG. 16, the rewind head 29 records data on the data bands DB8, DB7, DB6, and DB5 and reads data recorded on the data bands DB5 to DB8, at each operating position of the B1 position, the B2 position, the B3 position, and the B4 position. In addition, at each operating position, the rewind head 29 reads the servo patterns 50 recorded on the servo bands SB8 and SB9 that sandwich the data band DB8, the servo bands SB7 and SB8 that sandwich the data band DB7, the servo bands SB6 and SB7 that sandwich the data band DB6, and the servo bands SB5 and SB6 that sandwich the data band DB5. In summary, the acting regions of the rewind head 29 in this case are the data bands DB5 to DB8 and the servo bands SB5 to SB9. These data bands DB5 to DB8 and these servo bands SB5 to SB9 are an example of the "second region" according to the technology of the present disclosure. Therefore, the second region includes the data bands DB5 to DB8 of the other half out of eight data bands DB1 to DB8.

Figure 17:
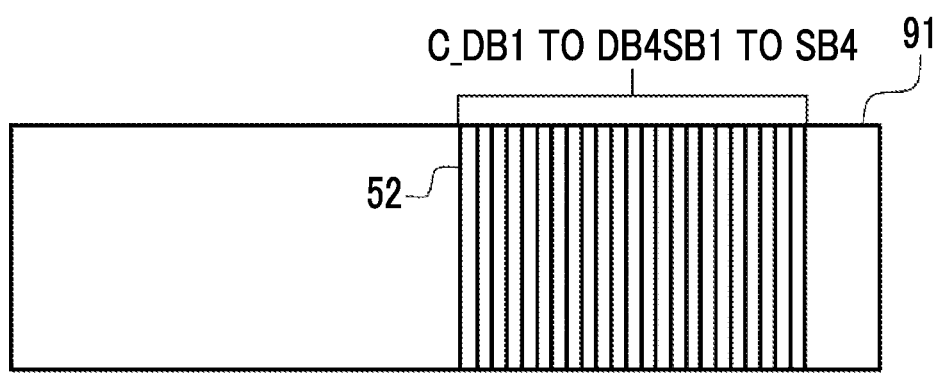
FIG. 17 is a plan view showing the rewind support roller in the example of FIG. 16.

The non-acting regions except for the acting regions of the rewind head 29 are the data bands DB1, DB2, DB3, and DB4 and the servo bands SB1, SB2, SB3, and SB4. Therefore, in this example, as shown in FIG. 17, the grooves 52 are formed in a rewind support roller 91 only in the regions C_DB1 to DB4SB1 to SB4 corresponding to the data bands DB1 to DB4 and the servo bands SB1 to SB4. According to this aspect, the grooves 52 can be collectively formed on one side of each of the feed support roller 86 and the rewind support roller 91 in the width direction.

Figure 18:
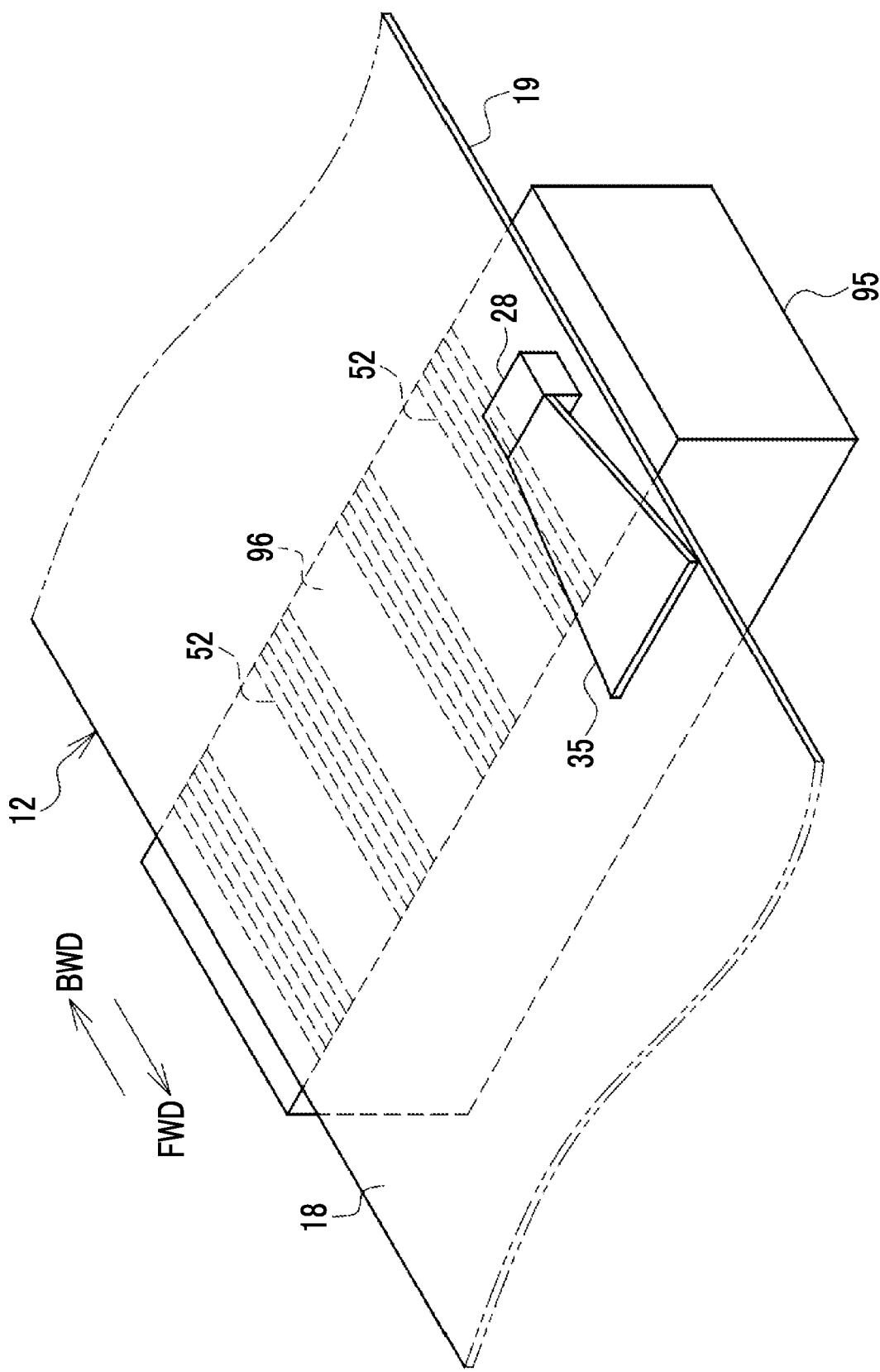
FIG. 18 is a diagram showing another example of a support member.

The support member is not limited to the roller. For example, a rectangular support member, such as a feed support member 95 shown in FIG. 18, may be used.

The feed support member 95 has a sliding surface 96 on which the back surface 19 of the magnetic tape 12 is slid. The grooves 52 are formed in the sliding surface 96 only in the region corresponding to the non-acting regions of the feed head 28. Even with such a configuration, it is possible to obtain an effect that variations in spacing SP can be reduced.

Although not shown, a support member with a half moon-shaped cross-section having a curved surface that is convex toward the magnetic head may be used.

The number of servo bands SB, the number of data bands DB, the number of data elements DRW, the number of data tracks DT that one data element DRW is in charge of, and the like shown above are merely an example, and the technology of the present disclosure is not particularly limited thereto.

For example, a magnetic tape in which five servo bands and four data bands are alternately arranged along the width direction WD may be used. Alternatively, a magnetic tape in which three servo bands SB and two data bands DB are alternately arranged along the width direction WD may be used. Alternatively, a magnetic tape in which 13 servo bands SB and 12 data bands DB are alternately arranged along the width direction WD may be used.

One magnetic head may be shared for feed/rewind without separating the feed head and the rewind head from each other. Further, the number of servo pattern reading elements SR disposed in one magnetic head may be one. Similarly, the number of data elements DRW disposed in one magnetic head may be one.

The number of data elements DRW disposed in one magnetic head may be, for example, 16, 32, or 64. Further, the number of data tracks DT that one data element DRW is in charge of for data recording and/or data reading is not limited to 12 illustrated above. The number of data tracks DT may be 1 or, for example, 4, 16, 32, or 64.

For example, in the above-described aspect in which the magnetic tape 12 has eight data bands DB, four feed heads 28 and four rewind heads 29 may be provided in conformity with four data bands DB that are in charge of recording and/or reading. That is, the same number of magnetic heads as the number of data bands DB may be provided.

The magnetic tape device 10 in which the cartridge 11 is loaded has been illustrated, but the technology of the present disclosure is not limited thereto. The magnetic tape 12 as it is in which the cartridge 11 is not accommodated may be a magnetic tape device wound on a feed reel, that is, a magnetic tape device in which the magnetic tape 12 is irreplaceably installed.

The magnetic tape 12 is not limited to the magnetic tape having the magnetic layer 16 containing ferromagnetic powder illustrated above. A magnetic tape in which a ferromagnetic thin film is formed by vacuum deposition, such as sputtering, may be used.

The computer constituting the control unit 32 may include, for example, a programmable logic device (PLD) which is a processor whose circuit configuration is changeable after manufacture, such as a field-programmable gate array (FPGA), and/or a dedicated electrical circuit which is a processor having a dedicated circuit configuration designed to execute specific processing, such as an application specific integrated circuit (ASIC), in place of or in addition to the CPU.

The technology of the present disclosure can also appropriately combine the above-mentioned various embodiments and/or various modification examples. In addition, it goes without saying that the technology of the present disclosure is not limited to the above embodiments and various configurations may be employed without departing from the gist thereof.

The contents described and shown above are detailed descriptions of the parts related to the technology of the present disclosure, and are merely an example of the technology of the present disclosure. For example, the descriptions of the above configurations, functions, actions, and effects are the descriptions of an example of the configurations, functions, actions, and effects of the parts related to the technology of the present disclosure. Accordingly, it is needless to say that unnecessary parts may be deleted, new elements may be added, or replacements may be made with respect to the contents described and shown above, without departing from the gist of the technology of the present disclosure. Further, in order to avoid complications and facilitate understanding of the parts related to the technology of the present disclosure, descriptions of common general knowledge and the like that do not require special descriptions for enabling the implementation of the technology of the present disclosure are omitted, in the contents described and shown above.

In the present specification, "A and/or B" has the same meaning as "at least one of A or B". That is, "A and/or B" means that only A may be used, only B may be used, or a combination of A and B may be used. In addition, in the present specification, the same concept as "A and/or B" is also applied to a case where three or more matters are expressed by "and/or".

All documents, patent applications, and technical standards described in the present specification are incorporated in the present specification by reference to the same extent as in a case where the individual documents, patent applications, and technical standards were specifically and individually stated to be incorporated by reference.

What is claimed is:

1. A magnetic tape device comprising:
a magnetic head having a magnetic element that acts in proximity to a magnetic layer formed on a front surface of a magnetic tape; and
a support member which is disposed at a position facing the magnetic head and against which a back surface of the magnetic tape provided on a side opposite to the front surface is pressed,
wherein the support member has a groove formed along a running direction of the magnetic tape only in a region corresponding to a non-acting region except for a region of the magnetic layer on which the magnetic element acts.

2. The magnetic tape device according to claim 1, wherein a width of the magnetic head is smaller than a width of the magnetic tape.

3. The magnetic tape device according to claim 1, wherein the support member is a roller.

4. The magnetic tape device according to claim 1, wherein the groove has a V-shaped cross-section.

5. The magnetic tape device according to claim 1, wherein a plurality of sets of the magnetic heads and the support members are provided.

6. The magnetic tape device according to claim 5, wherein the magnetic head includes
a feed head that operates in a case where the magnetic tape is fed out from a cartridge in which the magnetic tape is accommodated, and
a rewind head that operates in a case where the magnetic tape is rewound on the cartridge, and
the support member includes
a feed support member disposed at a position facing the feed head, and
a rewind support member disposed at a position facing the rewind head.

7. The magnetic tape device according to claim 6,
wherein the magnetic layer has a first region and a second region that are divided with respect to a width direction of the magnetic tape,
a magnetic element of the feed head acts on the first region,
a magnetic element of the rewind head acts on the second region,
the feed support member has the groove formed only in a region corresponding to the non-acting region except for the first region, and
the rewind support member has the groove formed only in a region corresponding to the non-acting region except for the second region.

8. The magnetic tape device according to claim 7,
wherein a plurality of data bands on which data is recorded are arranged in the magnetic layer along the width direction of the magnetic tape,
the first region includes data bands of one half out of the plurality of data bands, and
the second region includes data bands of the other half.

9. The magnetic tape device according to claim 8,
wherein the first region includes data bands of one party of odd-numbered data bands or even-numbered data bands out of the plurality of data bands, and
the second region includes data bands of the other party of the odd-numbered data bands or the even-numbered data bands.

10. The magnetic tape device according to claim 1,
wherein a plurality of data bands on which data is recorded, and a plurality of servo bands on which a plurality of servo patterns used for servo control to move the magnetic head in a width direction of the magnetic tape are recorded are formed in the magnetic layer, and
the data band and the servo band are alternately arranged along the width direction of the magnetic tape.

11. The magnetic tape device according to claim 10,
wherein the magnetic head has, as the magnetic element, two servo pattern reading elements corresponding to two servo bands that sandwich one data band, and
a data element provided between two servo pattern reading elements.

12. The magnetic tape device according to claim 11,
wherein the data element includes
a data recording element that records the data on the magnetic layer, and
a data reading element that reads the data recorded on the magnetic layer.

13. A method of operating a magnetic tape device, comprising:
causing a magnetic tape to run while pressing a back surface of the magnetic tape provided on a side opposite to a front surface on which a magnetic layer is formed against a support member disposed at a position facing a magnetic head, the support member having a groove formed along a running direction of the magnetic tape only in a region corresponding to a non-acting region except for a region of the magnetic layer of the magnetic tape on which a magnetic element of the magnetic head acts; and
causing the magnetic element to act in proximity to the magnetic layer of the magnetic tape in a state in which the back surface is pressed against the support member.

\* \* \* \* \*